M. C. WHITE.
COMPRESSOR AND MOTOR STARTER.
APPLICATION FILED JUNE 23, 1916.

1,351,269.

Patented Aug. 31, 1920.
6 SHEETS—SHEET 1.

Witnesses,
H. Gearing.
Alfred H. Daehler

Inventor,
Morris C. White,
By
His Attorney.

Fig.2.

M. C. WHITE.
COMPRESSOR AND MOTOR STARTER.
APPLICATION FILED JUNE 23, 1916.

1,351,269.

Patented Aug. 31, 1920.
6 SHEETS—SHEET 3.

UNITED STATES PATENT OFFICE.

MORRIS C. WHITE, OF LOS ANGELES, CALIFORNIA, ASSIGNOR TO M. C. WHITE COMPANY, OF LOS ANGELES, CALIFORNIA, A CORPORATION OF CALIFORNIA.

COMPRESSOR AND MOTOR-STARTER.

1,351,269.  Specification of Letters Patent.  Patented Aug. 31, 1920.

Original application filed November 28, 1914, Serial No. 874,384. Divided and this application filed June 23, 1916. Serial No. 105,418.

*To all whom it may concern:*

Be it known that I, MORRIS C. WHITE, a citizen of the United States, residing at Los Angeles, in the county of Los Angeles and State of California, have invented new and useful Improvements in Compressors and Motor-Starters, of which the following is a specification.

This invention relates to pneumatic pumps and engine starters. In accordance with the invention a portion of the energy of the engine may be utilized to operate the pump to compress air or other fluid; and a portion of such compressed fluid may be run through the pump in its reverse operation to start the engine. Thus the pump under the energy of fluid compressed by it may be utilized as a motor or engine for the purpose of starting the prime mover by which the pump is operated for the compression of such fluid. The invention provides therefore mechanism which is particularly adapted for use conjointly with internal combustion motors such as used in automobile practice, although not limited specifically to any such specific association. It may be with equal advantage applied similarly to marine motors or stationary engines, and in fact to any type of prime mover which requires initiation of movement of its working parts to set it into operation. The further advantage attaches that such starting mechanism serves as a pump for the compression of fluid not only to be re-used for such starting purposes upon reversal of the starting mechanism, but which may be utilized for divers other purposes, such as, in automobile practice, the inflating of tires and operation of pneumatic jacks, pneumatic gear shifting and the like. Many kinds of starting mechanisms have been devised for initiating movement in prime movers, utilizing electrical energy or the energy of spring drums, or operated by foot or by hand. Compressed air has likewise been used for such starters. The present invention, however, is to be distinguished radically from any such similar starters, in that by the aid of the prime mover it produces its own operating energy, which may likewise be used for other or further purposes than the operation of such starter.

In carrying the invention into effect, I provide in combination with the starting mechanism means whereby it may be thrown into operative connection with the motor or prime mover for operation as a pump to produce and store up transformed energy for its own operation, means for disconnecting such operative connections whereby the pump may be thrown out of service, such means comprising features subject to voluntary control and features automatically controlled, and further means whereby the same mechanism may be operatively connected with the prime mover or motor so that upon the reversal of operation of such mechanism the prime mover or motor may be started under the application to such mechanism of the energy produced and stored by it when operating as a pump.

In automobile practice the combined pumping and starting mechanism is conveniently mounted in juxtaposition to the motor, and the voluntary control for throwing the mechanism into and out of pumping operation and the means for reversing the mechanism to cause it to operate as a starter, are all conveniently arranged or mounted at or near the steering column whereby the operator may establish such working conditions as he desires for either pumping purposes or starting purposes. The motor vehicle will of course carry a container for the fluid compressed by the mechanism when operating as a pump. The means for causing automatic cessation of the pumping operation will be combined directly with such mechanism, and be a part of such mechanism as a unit.

I provide in practice apparatus for the combined purposes of pumping and starting which operates preferably upon the rotary principle, thus eliminating all reciprocating piston parts, valves for the same, and the packings and other adjuncts which are associated with such types of pumps and which cause frequent repair, adjustment and replacement. I thus obtain positive operation and long life of the apparatus and its parts, which is of high importance in apparatus of this character and particularly so when to be applied in service in which comparatively unskilled operators and drivers have to deal with such apparatus in the main. The invention in these respects provides an apparatus for the purposes stated which requires practically no attention and gives little or no trouble, thus filling a long felt want with a comparatively trouble proof device.

By utilizing the invention, particularly in the starting of internal combustion motors such as widely used at the present time in automobile practice and in marine or launch practice, the troublesome and likewise dangerous operation of cranking the motor manually is entirely eliminated.

The invention has for further objects the provision of apparatus or mechanism of the general nature stated which will be superior in point of relative simplicity and inexpensiveness of construction or organization considered in connection with positiveness of operation, durability, facility in control, and compactness in form and ready attachability and detachability or installation, and which will be generally superior in efficiency and serviceability.

The invention consists in the novel and useful provision, formation, combination, inter-relation and association of parts, members and features, all as hereinafter described, shown in the drawings and finally pointed out in claims.

This invention has features in common with that disclosed in Letters Patent No. 1,148,809, issued to me August 3, 1915, and pertaining particularly to the inter-relation of the rotors of the fluid-compression means together with the means for compressing fluid in the interspaces between the teeth of such rotors.

This application is divisional of an application for patent filed by me November 28, 1914, Serial No. 874,384, for compressors and motor starters.

In the drawing.

Corresponding parts in all the figures are designated by the same reference characters.

Figure 1:
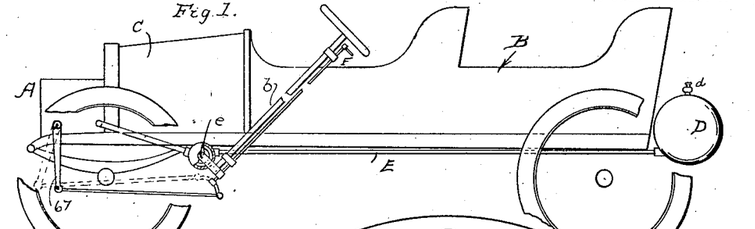
Figure 1 is a view partially diagrammatic and partially in elevation of a motor vehicle to which is applied pumping and starting mechanism embodying the invention, together with the several features of control, compressed fluid storage, and the like, which enter into the general system of pumping and motor starting contemplated by the invention.

Referring with particularity to the drawings, and for the moment more particularly to Fig. 1 thereof, A designates generally pumping and motor-starting mechanism embodying the invention, the same being shown in said Fig. 1 as applied to a motor vehicle B having the usual steering column $b$, said mechanism being combined with the internal combustion motor C within the hood or housing. A compressed fluid or container D is carried by the motor vehicle and communicates with the mechanism A by a pipe or conduit E. F designates means for controlling the mechanism A whereby its operation as a pump may be voluntarily initiated or terminated and whereby compressed fluid stored within the container D may be admitted to the apparatus A to cause it to operate as a starter for the motor C. The location of the mechanism A which is assembled in a compact unit, with respect to the motor C, is not essential, and various arrangements in assemblage and installations may be had all with respect to choice or convenience. The mechanism A however is provided with a drive shaft G which, in practice, is coupled, either directly or indirectly, with the crank shaft H of the motor, so that a permanent working relation exists between such mechanism and the motor through this shaft connection. K designates means whereby the power shaft or drive shaft G is operatively connected with the remaining elements of the mechanism A for actuation of such elements by the motor C as a pump. L designates means whereby the other elements or working elements of the mechanism A are automatically connected with the power shaft G to cause such mechanism to rotate the crank shaft H and start the motor. $k$ designates means included within the means K whereby the power shaft G is automatically disconnected from the other working elements of the mechanism A, to terminate pumping action thereof, after a predetermined number of revolutions of the power shaft G has been executed. M designates generally means for compressing fluid to be stored in the container D. Such means are mounted within a housing N provided with a front head or plate 15 and a rear head or plate 16, such means M including preferably two members or elements $m$ which are jointly rotated within such housing N to either compress the fluid to be stored, or responsive to the pressure of such compressed fluid, in the first instance for pumping, and in the second instance for motor starting. The features or elements K and L are accommodated within a second housing O which is disposed rearwardly of the housing N, and is provided with a back plate 17, such housing O and back plate thereof being attached to the rear head 16 of the housing N by tie-bolts or the like 18. The elements $m$ of the fluid compression means M preferably comprise each a cylindrical rotor provided with herringbone teeth 19 separated by complementary interspaces 20, such rotors being matched to intermesh and each being provided with a shaft 21 which shafts are mounted in bearings 22 upon the front head 15 and 23 upon the rear head 16 of the housing N, being provided with suitable anti-friction devices or ball bearings 24 or the like. The power shaft G ranges through both housings N and O and is mounted rotatively in a bearing 25 upon the front housing head 15, and in a journal 26 upon the rear plate 17 of the housing O, being likewise provided with an auxiliary bearing 27 formed in a bottom extension 28 of the housing N, which has other features to be hereinafter pointed out.

Figures 11, 12, 13:
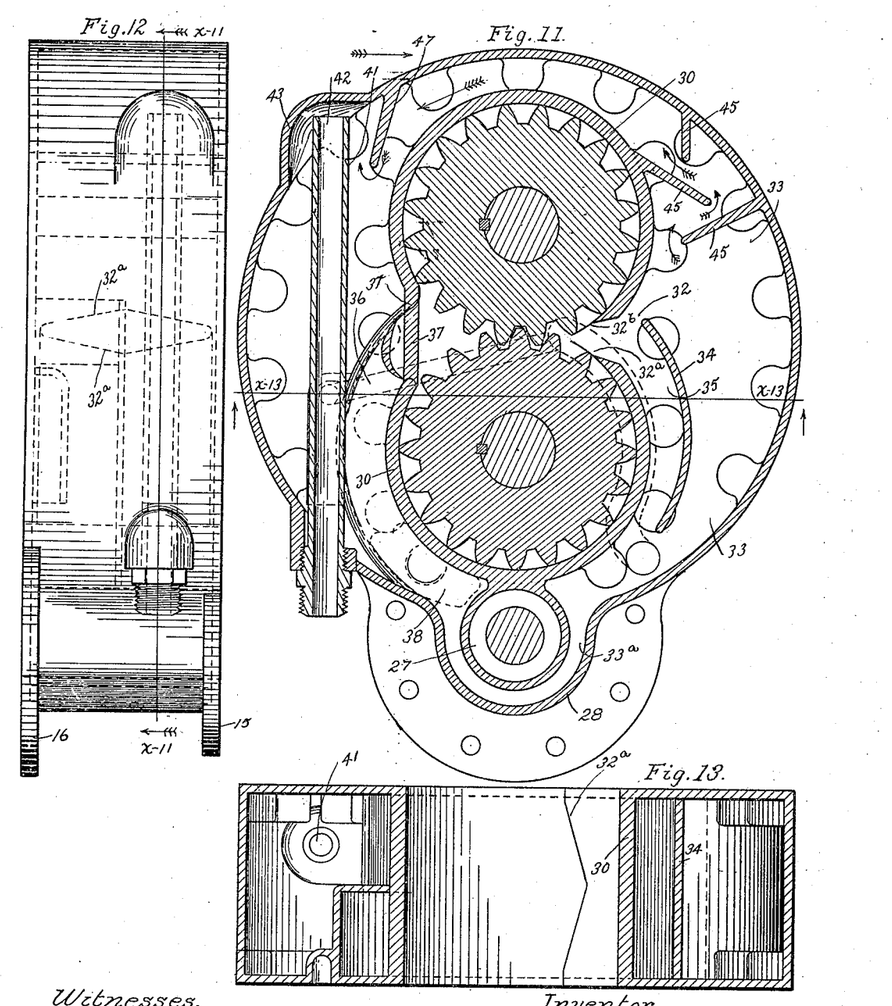
Fig. 11 is a vertical sectional view taken upon the line $x^{11}$—$x^{11}$, Fig. 12, and looking in the direction of the appended arrows.
Fig. 12 is a side elevation of the rotor casing in detached position, including the features shown in Fig. 11, and looking in the direction of the appended arrows in Fig. 11.
Fig. 13 is a transverse sectional view taken upon the line $x^{13}$—$x^{13}$, Fig. 11, and looking in the direction of the appended arrows, parts being omitted for clearness of illustration.
Figure 15:
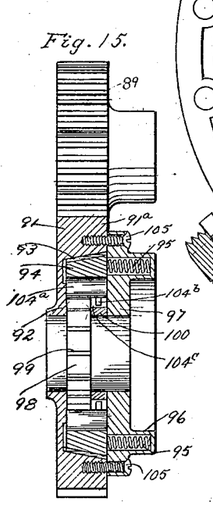
Fig. 15 is a detail transverse sectional view taken upon the line $x^{15}$—$x^{15}$, Fig. 4, and looking in the direction of the appended arrows.

The tie-bolts 18 serve to also hold the rear head 16 to its housing, and short bolts 29 detachably secure the front head 15 to its housing. The rotors $m$ thus abut at their plane ends against the heads 15 and 16, and said rotors are confined in their zones of rotation by a double cylinder or casing 30 cast within the housing N. This casing 30 is so formed that the teeth of the rotors sweep the inner surface of the same throughout a major portion thereof, there being a flattened part 31 of such surface opposed to or cutting the plane of intermeshing of the rotors at one side of the same, and a mutilated nose 32 in direct opposition to such flattened portion 31. A continuous chamber is provided between the casing 30 and the housing N, which is traversed by the fluid compressed in the pumping operation, or by the compressed fluid supplied to the rotors in the motor starting operation, such chamber, 33, including a loop $33^a$ which dips beneath the power shaft G in the housing extension 28. A transverse wall 34 springs from the upper portion of the mutilated nose 32, and extends downwardly spaced from the lower lobe of the casing 30, providing a passage 35 communicating at its lower end with the chamber 33. This nose 32 is in its mutilated formation cut away so as to produce angular transverse walls $32^a$, shown in full lines in Fig. 13 and in dotted lines in Fig. 12, the angularity of each of which corresponds to the angularity of the teeth 19 of the herringbone toothed rotors $m$, producing an orifice $32^b$ which in plan is that of an elongated diamond. This orifice constitutes the discharge orifice for the fluid compressed by the rotors $m$ and introduced into the final compression chamber 33, in pumping, and constitutes the feed port to the rotors whereby compressed fluid drawn from the container D is supplied through the chamber 33 to the rotors for operating the same. The air or other fluid to be supplied to the rotors $m$ for pumping is inducted through a feed conduit 36 cast into the housing N and the casing 30 within the same, the same opening at 37 in an orifice which is produced through the flattened portion 31 of the casing 30. This conduit 36 leads downwardly to a port 38 in the rear housing head 16, which communicates with the interior of the housing O, from which fluid to be compressed is drawn into the casing 30 of the rotors. As will hereinafter be pointed out, a fluid in addition to that to be compressed is likewise inducted at this point, being a lubricant which in addition to the function of lubricating the working parts of the mechanism A performs the function of lubricating the rotors $m$ and sealing the same to prevent dissipation of the fluid to be compressed around the rotors and likewise serves to produce an initial compression of the fluid to be compressed in the interspaces between the rotor teeth 19. The fluid to be compressed is drawn into the housing O through a pipe or tube 39 provided within such housing O, being extended from the lower portion of the same where it is provided with an exterior connection nipple 40, to the upper portion of such housing, above the lubricant content thereof.

The liquid lubricant seal, preferably consisting of lubricant oil, is initially drawn into the housing O with the early charges of air or other fluid to be compressed, through the pipe 39, and preferably from a tank, not shown, having baffles or strainers or the like to produce even flow. The fluid compressed by the rotors and introduced within the chamber 33 finds its way eventually to the upper end of a discharge pipe 41 mounted within the housing N, at one side of the casing 30, and having its upper end 42 slightly spaced away from an enlargement 43 upon the housing, and its lower end projected through the lower portion of such housing at one side, and provided with a connection nipple 44 for the pipe E which extends to the compressed fluid container D. Within the chamber 33, at the same side as the discharge orifice $32^b$, and slightly above the same, are a plurality of downwardly ranging baffles 45, springing from the walls of the housing N and the casing 30, upwardly toward which the compressed fluid is discharged through a port 46 in the shell or wall 34. Lubricant discharged through the orifice $32^b$ in the main finds its way downwardly through the passage 35 into the lower portion of the chamber 33. Such portions of the same as pass the port 46 will be in the main retained by the baffles 45 and downwardly directed into the well which comprises the lower portion of the chamber 33. The compressed fluid will therefore take the general tortuous course designated by the arrows in Fig. 11, passing a final baffle 47 at one side of the discharge tube 41, and thence rising to the upper end of such discharge tube and issuing through the latter to the container D through the pipe E. Within this pipe E the check valve $e$ is provided, adjacent to the connection nipple 44, preventing return flow to the chamber 33, excepting when the means F are brought into use for positively unseating such check valve so as to permit compressed fluid stored in the container D to be utilized in reversing the mechanism A as a motor starter. When this takes place, the compressed air or other fluid is fed to the chamber 33 through the discharge tube 41, past the baffles 45 and 47, through the port 46, through the orifice $32^b$ into the rotors in the casing 30 to reversely operate the same and cause the power shaft G to forwardly rotate the crank shaft H of the motor, through the agency of the means L for operatively connecting the other mechanism features with such drive shaft G, such means L remaining inoperative when the power shaft G is itself forwardly operated by the crank shaft of the motor. When such reversing operation takes place, the means F are utilized, in addition to unseating the check valve $e$, to throw out of operation the means K whereby the mechanism A is positively coupled with the crank shaft for pumping action, unless such relation has been already established, namely such disconnection of the drive shaft G from the remaining features of the mechanism A, by the means $k$ for automatically producing this result.

Figures 8, 9:
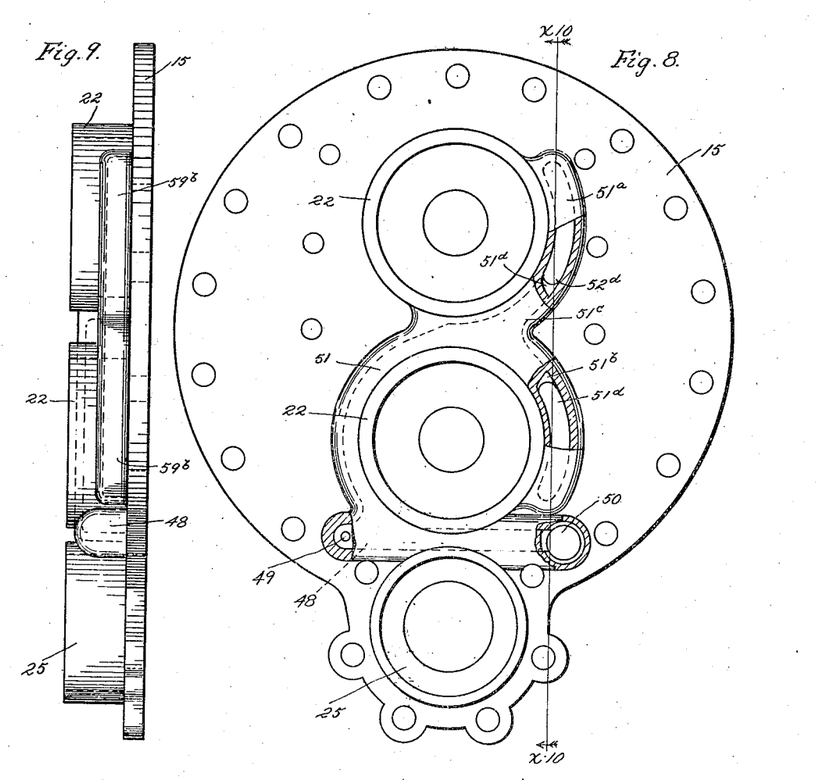
Fig. 8 is an outer, partly broken away, view of the front rotor case plate or head in detached position.
Fig. 9 is an edge view of the same.
Figure 10:
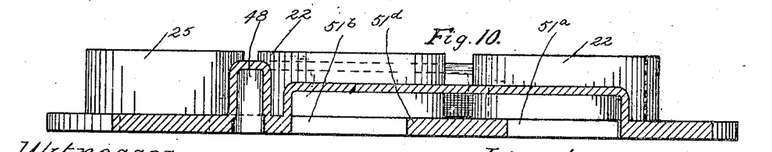
Fig. 10 is a vertical sectional view of the same taken upon the line $x^{10}$—$x^{10}$, Fig. 8, and looking in the direction of the appended arrows.

It will be understood from the foregoing remarks with respect to the initial induction of lubricant fluid within the housing O through the pipe 39, that a considerable quantity of such fluid will be confined within such housing to lubricate the features therein contained, and a considerable quantity will likewise be drawn over into the housing N. This is utilized on the general principle disclosed in my other application for patent initially herein referred to, for the purpose mentioned of sealing and lubricating the rotors $m$, and of initially compressing within the interspaces between the teeth thereof the air or other fluid to be compressed by the rotors and within the chamber 33. In order to obtain this result, the front and rear heads 15 and 16 of the housing N are provided with suitable passages or channels or ducts for conveying to the ends of the tooth interspaces the lubricant for the purposes stated. The casing head 15 to this end is provided upon its outer face with a transverse duct 48, between the lower bearing 22 and the bearing 25, which communicates at its ends with ports 49 and 50 produced through such head 15, and communicating with the chamber 33 at the respective sides of the rotor casing 30, the former preferably being smaller than the latter, so that the greater quantity of lubricant passing into such duct will come from the side of the chamber 33 to which discharge is immediately made through discharge orifice $32^b$. Drawing from both sides of this chamber produces a more complete circulation and keeps the entire fluid content in motion. A duct 51 leads from the end of the duct 48 adjacent to the port 49 around the lower bearing 22 to a point between such bearings 22 where it is subdivided to produce branch ducts $51^a$ and $51^b$ which respectively skirt the confines of the bearings 22, and are provided at their junction with a port $51^c$ passing through the head 15 into the rear side thereof, where said ducts throughout their extent traverse the inner surface of such head. The ducts 48 and 51 thus traverse the outer surface of the head 15 and the branch ducts $51^a$ and $51^b$ traverse the inner surface of such head, the latter branch ducts being in the form of arcs which coincide with arcs of the paths of rotation of the rotors m and of the teeth thereof, so that said duct branches 51$^a$ and 51$^b$ directly communicate with the interspaces between such teeth. The ducts 48, 51, 51$^a$ and 51$^b$ are produced by casting enlargements upon the head 15. A shield 51$^d$ is placed over the port 51$^c$, in the plane of the inner face of the head 15, extending over the ducts 51$^a$ and 51$^b$ part way from the port 51$^c$ outwardly, as shown in Fig. 8, cutting off communication of the interspaces between the rotor teeth with such ducts before such interspaces have come into communication with the discharge orifice 32$^b$. Similarly, upon the outer or rear face of the rear head 16 of the housing N, I provide a duct 52 ranging from the left side of such plate about midway of its ends transversely thereof between the bearings 23, where it branches to produce branch ducts 52$^a$ and 52$^b$, which skirt the sides of the bearings 23. At the point of junction of the duct 52 and the branch duct 52$^a$ and 52$^b$ a port 52$^c$ is produced through the plate 16 communicating with the branch ducts which open through the inner face of the plate 16, such port 52$^c$ being covered by a shield 52$^d$, so that the branch ducts, arcuate in form, only open over those portions of the paths of rotation of the teeth of the rotors wherein the interspaces between the teeth may communicate with such branch ducts prior to coming into communication with the discharge orifice 32$^b$. The outer extremity of the duct 52 communicates with the interior of the chamber 33 by means of a relatively small port 53; and an extension of the branch duct 52$^b$ communicates with a relatively larger port 54 through the head 16, such ports 53 and 54 communicating with the same sides of the chamber 33 with which the respective ports 49 and 50 in the head 15 communicate. The lubricant fluid within the chamber 33 being under the pressure of the compressed fluid traversing such chamber, such lubricant fluid passes from the chamber 33 through the ports 49 and 50 and 53 and 54, into the two systems of ducts 51, et cetera, and 52, et cetera, and is forced into the interspaces, and at both ends thereof, of the rotating rotors, producing an initial compression in such interspaces of the air inducted thereto through the pipe 36, being fed to such interspaces after the air has been confined within such interspaces by the teeth bounding the same and the inner wall of the two-lobed casing 30. Just before the interspaces come into communication with the discharge orifice 32$^b$ in the mutilated nose 30, between such casing lobes, communication of such interspaces with such lubricant-supplying ducts is interrupted by the shields 51$^d$ and 52$^d$ so that the pressures in such interspaces, to which such lubricant fluid is subjected, will not counter-balance and the interspaces be prevented from being properly filled with lubricant fluid.

Figure 2:
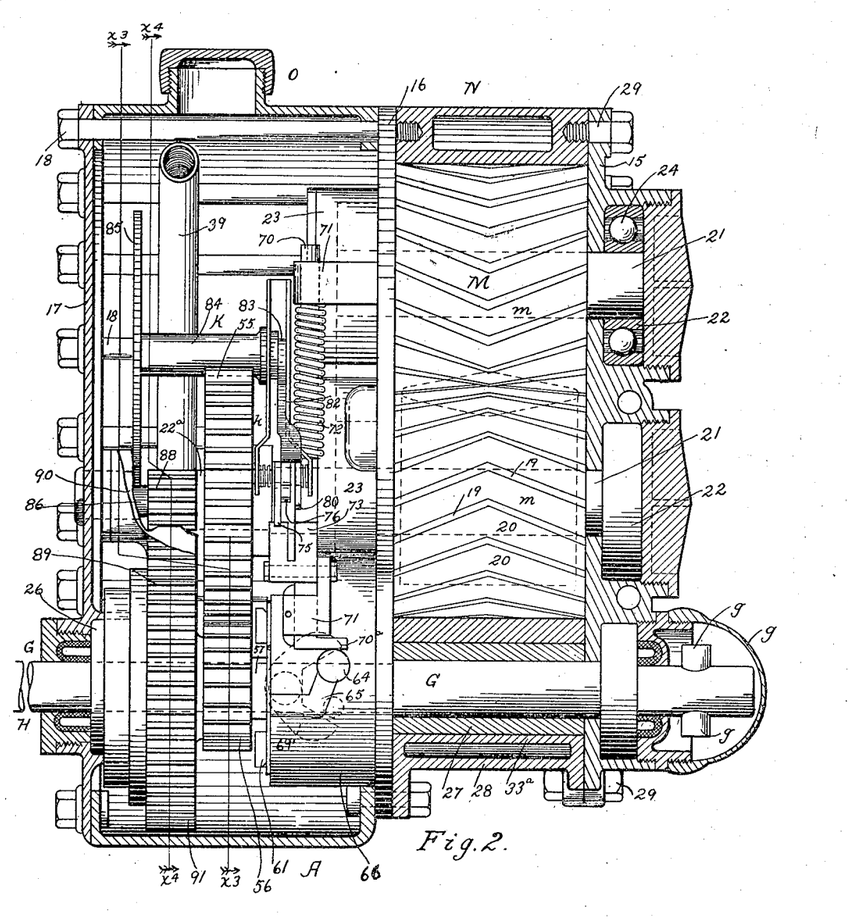
Fig. 2 is a central vertical sectional view, parts being in elevation, of motor starting and pumping mechanism constructed and organized to embody the invention, the same being shown in detached position.
Figures 3, 14:
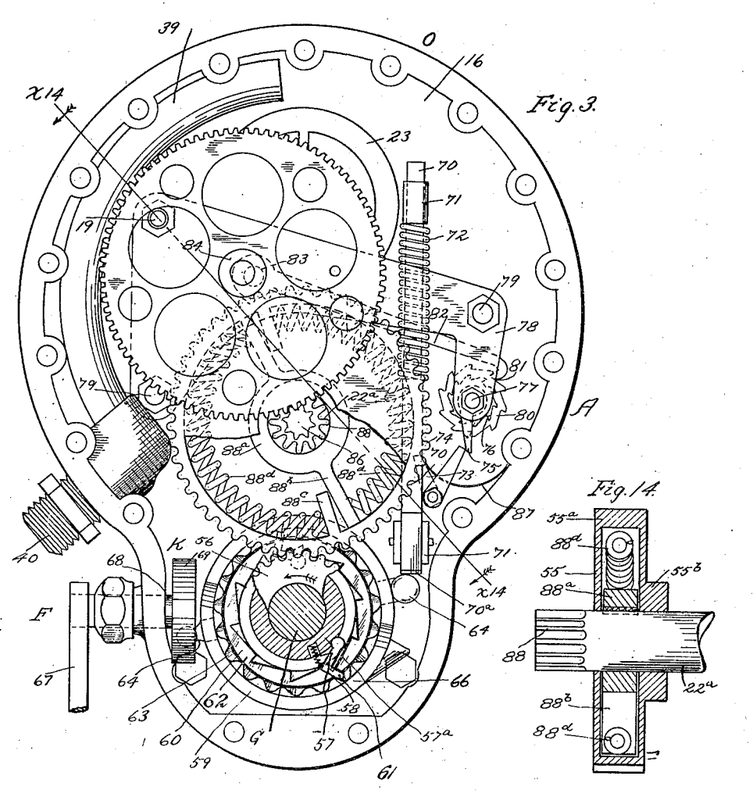
Fig. 3 is a vertical sectional view, partly in elevation and partly broken away for clearness of illustration, taken upon the line $x^3$—$x^3$, Fig. 2, and looking in the direction of the appended arrows.
Fig. 14 is a detail transverse sectional view taken upon the line $x^{14}$—$x^{14}$, Fig. 3, and looking in the direction of the appended arrows.

The means K for operatively connecting and disconnecting the drive shaft G with or from the rotors m comprises a gear 55 mounted upon the rearward end of the shaft 22$^a$ of the lowermost rotor m, said rotors being shown as arranged in a superposed pair, and said shaft 22$^a$ extending rearwardly beyond the bearing 23 as clearly shown in Fig. 2; with which gear 55 meshes a pinion 56 upon the power shaft G. Said means K further includes dogs 57 pivoted to the hub 57$^a$ of the pinion 56, which pinion and hub are loose upon the power shaft G, said hub extending forwardly from the pinion to carry such dogs, and said dogs being outwardly urged by compression springs 58 seated in recesses in the hub, said dogs 57 being adapted to enter notches 59 formed in the inner surface of a shell 60 fast upon the power shaft G and surrounding the hub 57$^a$, and spaced therefrom to accommodate such hub and the dogs carried thereby. The dogs are provided with angular ears 61 projecting beyond the rearward end of such shell 60, and outwardly beyond the periphery thereof, as shown in Fig. 2, into position to be engaged by an inner scalloped surface 62 of a still outer shell 63 surrounding the shell 60 and adapted to play lengthwise of the power shaft G so as to force inwardly the dogs 57 and limit their engagement with the notches 59 to free the hub 57$^a$ from the shell 60 which is fast upon the power shaft G. The means K and $k$ are utilized for the purpose of shifting the shell 63 lengthwise of the shaft G to permit the rotative coupling of the hub 57$^a$ with the shell 60, and to terminate such rotative couple. These means $k$ are organized as follows: The outer shell 63 is likewise rotatable about the shell 60, and is provided with diametrically opposed heads 64 which project through cam slots 65 in a fixed annular housing 66 projecting rearwardly from the back or rearward head 16 of the housing N, and surrounding the shell 63. These heads when caused to play in the annular inclined cam slots 65 rotation of the shell 63, causes such shell 63 to move longitudinally of the power shaft G, whereby the fluted inner surface 62 thereof may be caused to force the dogs 57 inwardly to free the hub 57$^a$ from the shell 60 fast to the power shaft G, or to permit such interengagement of the dogs and shell 60 for the purpose of establishing rotative coupling between the hub and such shell fixed to the shaft G, so that such shaft may be rotated by the crank shaft H of the motor C. The means F for manual control of such last described means, including the heads 64 fixed to the shell 63, include a connecting rod and crank 67 or the like for rocking a short shaft 68 journaled at one side wall of the housing O, which in turn oscillates a fork 69 embracing one of the heads 64, whereby the shell 63 may be rotated and advanced or retracted to permit the engagement or disengagement of the dogs 57 with the shell 60 as above set forth. The means $k$ more particularly are for automatic operation of the shell 63, and of the several features included in the means K above described. These means $k$ include a plunger 70 mounted in guides 71 mounted upon the bearing 23 and fixed shell 66 respectively. This plunger 70 is squared at its lower end to prevent rotation and is round at its upper portion and at such portion is surrounded by a coil compression spring 72 confined by the uppermost portion of the squared portion and the upper guide 71, whereby it is held in engagement with the other head 64, by means of a forwardly projected finger $70^a$ always in contact with such head. The plunger 70 is held in normal elevated position, permitting the rotative couple of the power shaft and the pinion 56, by an angular dog 73, which takes under a nose 74 in the square portion of the plunger, holding such plunger up against the compression of the spring 72. This dog may be released from the plunger to allow the same to be depressed, to rotate the shell 63 to engage the same with the dogs 57 and permit the uncoupling of the pinion 56 and the power shaft G, by means of a finger 75 carried by a smaller ratchet 76 turnable upon an arbor 77 in a bifurcated bracket 78 fixed as at 79 to the head 16, there being a larger ratchet 80 rotatable upon the same shaft or arbor, and having a single notch 81 between two of its teeth, projecting inwardly to the same depth as the notches of the smaller ratchet 76. With these ratchets coöperates a pawl 82 which is mounted upon a crank 83 connected with a shaft 84, to which is fixed a large gear 85 meshing with a small pinion 86 inserted in the rearward end of the shaft $22^a$ of the lower rotor $m$. The gear ratios of the pinion 86 and gear 85 are such, that upon the completion of a predetermined number of rotations of the rotors $m$, the pawl 82 is given an endwise movement to move the larger ratchet 80 one notch or step and when one complete rotation of the larger ratchet has been completed so that the pawl comes into the enlarged notch 81 in such larger ratchet, it is likewise brought into one of the notches of the smaller ratchet 76, giving that a one step actuation. A certain ratio exists between the movements of teeth upon the smaller ratchet 76 and of the single enlarged notch 81 upon the larger ratchet 80, so that a complete revolution of the smaller ratchet 76 takes place on the completion of a predetermined number of rotations of the larger ratchet 80, resulting in a complete rotation of the finger 75 which once during each rotation actuates the dog 73 to withdraw it from the notch 74 in the plunger 70 and permit the same to fall under compression of the spring 72 to rotate and rearwardly move the shell 63 to free the dogs 57 from the shell 60 and disconnect the pinion 56 from the power shaft G. Thus it may be provided that on say one thousand revolutions of the rotors $m$ the shaft G will be automatically disconnected from the pinion 56; whereby pumping action will cease, as the pinion 56 will stand idly upon the power shaft G, and the meshing gear 55 of the lower rotor shaft $22^a$ will be brought to a stop.

As above stated, this coupling or uncoupling of the power shaft G from the pinion 56 for starting or stopping the pumping action may likewise be voluntarily produced through the means F and the crank rod and crank 67 or the like, to operate the shell 63 to act upon the dogs 57 as above set forth, movement of the shell 63 in a rearward direction disconnecting the power shaft G from the pinion 56, and movement of the shell 63 in a forward direction operatively connecting the power shaft and the pinion 56. When the shell 63 is by means of the means F moved forwardly to establish rotative couple of the power shaft and the pinion 56, the plunger 70 is again raised by its head 64, and a leaf spring 87 forces the dog 73 back into the notch 74 in the plunger, setting the means $k$ so that they may again automatically operate to release the power shaft G from the pinion 56 and stop the pumping action of the mechanism A in the manner above described, unless it is previously stopped by the means F.

Means are provided for yieldingly initiating the operation of the means K, through the gear 55, such gear 55 consisting of an annulus $55^a$ having a hub $55^b$ rotatable upon the shaft $22^a$. Keyed to such latter shaft is a hub $88^a$ which is provided with lateral arms $88^b$, within the annulus $55^a$, and disposed in positions to engage with radial arms $88^c$ projecting inwardly from the annulus $55^a$, segmental coil springs $88^d$ being stopped each at one end by one of the arms $88^b$ and one of the arms $88^c$, to the end that rotation of the annulus $55^a$ by the pinion 56 will be transmitted to the shaft $22^a$ through a yielding take up, such annulus $55^a$ rotating such shaft through the hub $88^a$ which is set into motion through the springs $88^d$. Thus sharp and abrupt initiation of pumping action is obviated, and the rotors at all times are driven subject to the yield of the spring cushion provided by the spring $88^d$; or the springs being compressed to their limit an unyielding bridge is interposed between the annulus 55ª and the hub 88ª.

The means L for automatically operatively coupling the rotors m with the drive shaft G to turn the motor crank shaft H for the purpose of starting the motor, and of course in the same direction in which such motor shaft turns when the rotors are compressing fluid as a pump, comprises, as about to be described, means whereby reversed rotation of the rotors is converted into rotation of the drive shaft in the one direction in which it at all times rotates. To this end, I provide upon the rearward end of the shaft 22ª of the lower rotor m, just foward of the small pinion 86, a pinion 88 into which the rearward end portion of the shaft 22ª is formed, which meshes with an idler 89 carried upon a stub shaft 90 mounted in the rear plate 17 of the housing, and which in turn meshes with a large gear 91 having as a center the power shaft G. The pinion 88 of course rotates in one direction during pumping action and in the opposite direction during motor starting action, and the idler 89 is introduced within the train of gears of the means L for the purpose of providing rotation of the gear 91 in the same direction as that in which the power shaft G is always to be rotated. The gear 91 comprises a peripherally toothed annulus 91ª which directly meshes with the idler 89, and has a rearward hub 92 rotative upon the power shaft G. Within such annulus 91 is provided a metallic liner 93 slightly dished in form, and into which fits a similarly formed annulus 94 held frictionally therein by compression springs 95 housed in chambers in an annulus 96 having a hub 97 which is rotatable upon the shaft G. Inward of the annulus 94 is mounted a further annulus 98 having ratchet teeth 99 upon its outer periphery, such annulus being keyed to the power shaft G. Farther withi nthe annulus 94 are provided a pair of segmental shoes 100, embracing the power shaft G frictionally, and held lightly to such power shaft by compression springs 101 surrounding pins 102 which are applied to ears 103 upon such segmental shoes 100. The annulus 94 carries a pair of diametrically opposed dogs 104 each of which is provided with a rounded outer end portion 104ª seated to rock in a suitable recess in the annulus 94, such dogs being adapted to engage the teeth 99 of the ratchet 98, when forced thereinto in the manner about to be stated. To produce this result, rotation of the annulus 91 causes rotation of the anulus 94 through the liner 93, which occurs upon the rotation of the rotors m in motor starting action, the annulus 91 rotating idly in an opposite direction when the rotors m are pumping. Rotation therefore of the annulus 91 in the direction indicated by the arrow adjacent thereto in Fig. 4, causes the dogs 104 to be swung inwardly, fingers 104ᵇ upon such dogs and received within recesses 104ᶜ in the shoes 100 tripping such dogs and causing such engagement thereof with the ratchet teeth 99, whereupon the power shaft G is caused to rotate. Therefore upon rotation of the rotors m in a starting direction, the shaft G is rotated in its normal forward direction, and the motor is turned over and started in the usual manner through the crank shaft H. The annulus 97 is mounted upon the annulus 91, as by screws or the like 105.

Figure 4:
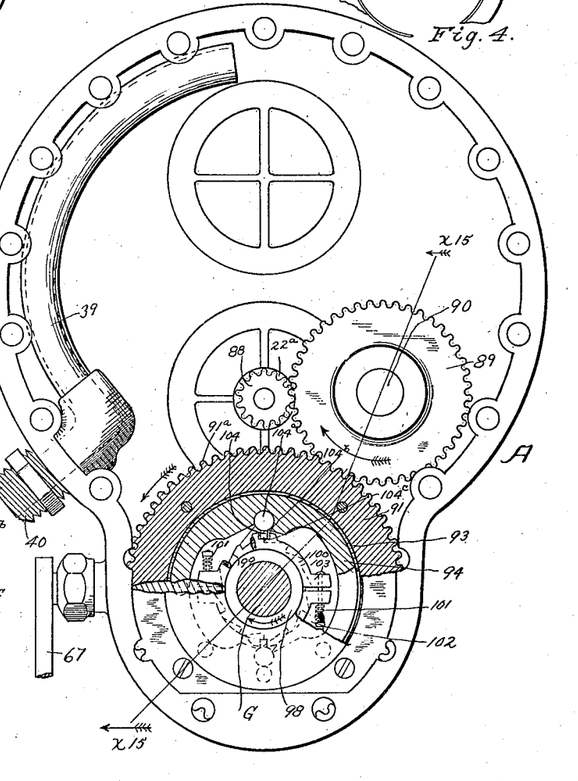
Fig. 4 is a vertical fragmentary sectional view, partly in elevation and partly broken away for fullness of illustration, taken upon the line $x^4$—$x^4$, Fig. 2, and looking in the direction of the appended arrows.
Figure 5:
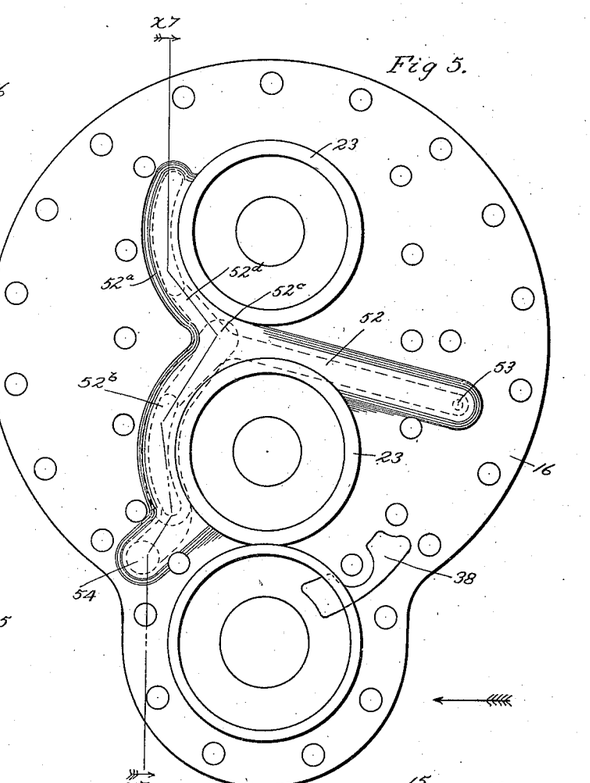
Fig. 5 is a rear face view of the rear motor casing head in detached position.
Figure 6:
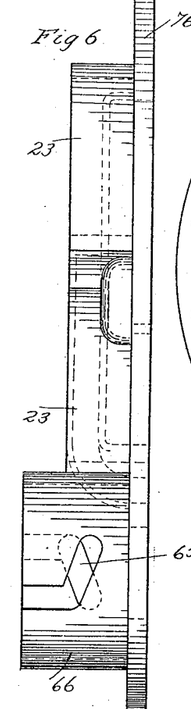
Fig 6 is an edge view of the same looking in the direction of the arrow adjacent to Fig. 5.
Figure 7:
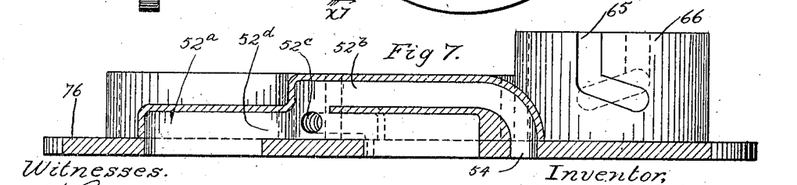
Fig. 7 is a vertical detail sectional view, taken upon the line $x^7$—$x^7$, Fig. 5, and looking in the direction of the appended arrows.

When the rotors m are operated in pumping direction, the idler of course executes rotation in a direction opposite of that indicated by the arrow in Fig. 4, the annulus 91 and the annulus 94 are operated in a direction the opposite of that indicated by the arrow in Fig. 4, and the fingers 104ᵇ on the dogs 104 are swung by the shoes 100 so as to drive the dogs outwardly from engagement with the ratchet teeth 99. The shoes 100 travel with the annulus 94, at such time, so that the fingers 104ᵇ remain within the recesses 104ᶜ, ready to actuate the dogs inwardly to the ratchet teeth for motor starting action upon reversal of the rotation of the rotors m. Thus, the means L just described only operate when the rotors are operating in a motor starting direction, and of course at such times the means K for operatively connecting the rotors with the power shaft G for pumping action are thrown out of operation.

The pipe E preferably admits the compressed fluid to the container D, and withdraws the same from such container, at the bottom thereof, to the end that any lubricant which may be carried over into said container with the compressed fluid will first be withdrawn from such container when compressed fluid is taken therefrom.

I have not described in detail the construction of the check valve e, but the same may be of any preferred construction and so mounted as to be unseated by the means F, when motor starting is to be performed by the mechanism. The means F further include the link and crank 67 for manually throwing into or out of operation the means K for driving the rotors for pumping purposes.

The operation, method of use and advantages attaching and pertaining to the improved mechanism constituting the invention and as exemplified in the particular form of construction and inter-relation of features disclosed in the drawings and above described will be readily understood from the foregoing description, in which the operation of the several elements and groups of elements and features is detailed, taken together with the accompanying drawings and the following statement:—

When it is desired to initiate pumping action through the rotors m, to store compressed fluid, such as air, in the container D, the means F are utilized at the steering column b, to rock the shell 63, whereby the dogs 57 are released for co-engagement with the shell 60, thereby rotatively coupling the pinion 56 through its hub 57$^a$, with the power shaft G, and causing the rotation of the gear 55 which yieldingly commences rotation of the shaft 22$^a$ of the lower rotor, and joint rotation of such rotors thereupon commences. Thereupon fluid to be compressed such as air and lubricant fluid, are both drawn into the housing O through the pipe 39, at the connection nipple 40, from a lubricant tank as above described, and a lubricant fluid is discharged within the housing O over the gears and other features of the means K and L within such housing, providing a lubricant bath within such housing to insure free running of the working parts therein. Likewise, such lubricant fluid and air are drawn from the housing O through the port 39 in the rear head 16 of the housing N into said latter housing, both fluids passing through the conduit 36 from such port 38, upwardly to the port 37 in the casing 30 of the rotors. Both fluids are passed around the rotors, and discharged at the discharge orifice 32$^b$ into the chamber 35 and the lubricant directed downwardly in such chamber to the lower portion of the chamber 33 within the housing N, where such lubricant tends to provide a charge of lubricant fluid within the lower portion of such chamber 33. The air compressed between the rotors, by being subjected to pressure of the intermeshing teeth thereof, passes through the shield 34 at the port 46, traverses the surfaces of the baffles 45 and 47, in a tortuous course, tending to rid such compressed air of any content of lubricant fluid, and then rises to the upper end of the discharge pipe 41 through which it issues to the connection nipple 44 and is conducted by the pipe E to the container D. After the normal charge of lubricant, which is predetermined, is drawn into the housings N and O, so that a proper level of the same is established in each housing, and no more of such fluid is passed through the port 38 into the chamber 33, and the level of such lubricant fluid in the chamber 33 is so low that only air passes through the port 38 and is carried upwardly through the pipe 36 to the port 37, air alone will be supplied to the rotors to be carried by the interspaces between the teeth thereof around said rotors and to the compression zone, where compression and discharge will take place through the orifice 32$^b$. In order to continue the supply of lubricant to the rotors during such normal stage of pumping operation, and in order to enhance the compressing action of said rotors, the several ducts 52, 52$^a$, 52$^b$, and 48, 51$^a$ and 51$^b$, and their attendant features are provided, serving to draw lubricant from the well at the lower portion of the chamber 33, at the front of the rotors by means of the smaller port 49 and larger port 50, and at the rear of the rotors by means of the smaller port 53 and the larger port 54, respectively, from the left and right-hand zones of such chamber 33, so that stagnation of the lubricant fluid is obviated, and a constant circulation and utilization of the same is assured. These several ducts and branch ducts supply the lubricant to the rotors at the teeth of the same and into the interspaces between the teeth, during portions of the paths of rotation of such rotors just prior to the stages thereof when the rotor teeth come into mesh, and just prior to the commencement of communication of the interspaces with the discharge orifice 32$^b$, as above described; the communication of such ducts with the interspaces during communication of the interspaces with the discharges orifice being prevented by the shields 51$^d$ and 52$^d$ over the respective ports 51$^c$ and 52$^c$. The lubricant so supplied by said ducts effectively seals the rotors to prevent air slippage, and effectively lubricates the working surfaces of such rotors, and also being supplied to the interspaces between the teeth and at the ends thereof and subsequent to the provision of air charges in such interspaces, causes a lubricant piston compression of the air in such interspaces prior to the final compression by intermeshing of the teeth of the rotors, which results in squeezing out the compressed air from the interspaces through the discharge orifice 32$^b$, followed by an expulsion of such oil pistons which are discharged through the passage 35 and fall into the lubricant well in the lower portion of the chamber 33. When it is desired to terminate the operation of the rotors in pumping action, it is only necessary to manually operate the means F, rocking the crank 67 and again rocking the shell 63, to rearwardly move it and bring its notches 62 over the ears 61 on the dogs 57, retracting such dogs from the recesses 59 in the ratchet annulus 60, whereby the pinion 56 is loosened from the drive shaft G and such drive shaft continues to rotate without operation of the rotors for pumping action. Or, if it be desired that a predetermined amount of compressed fluid be introduced within the container D, the automatic means k comprised within the means K may be relied upon, the plunger 70, which has been set and locked by its dog 73 when the pinion 56 was rotatively coupled with the drive shaft G, being freed from such dog by the finger 17 at the end of a predetermined number of rotations of the gear 85, through the agency of the pawl 82 cranked to the shaft 84 of such gear 85. When the plunger 70 falls, it again rocks and rearwardly moves the shell 63, to free the pinion 56 from the drive shaft G, by releasing such pinion, through release of the dogs 57, from the rotating shell 60. When the means K are thrown into operation, the plunger 70 is again set and held by its dog 73, for further automatic release in the manner just described, unless the pumping has previously been terminated manually by the means F.

When it is desired to utilize any of the compressed fluid in the container D, for instance to pump tires or for pneumatic gear shifting or purposes other than motor starting, such fluid may of course be withdrawn through a separate cock or connection, as $d$, indicated in Fig. 1. When it is desired to utilize the compressed fluid in the container D for starting the motor with which the mechanism A is associated, it is only necessary to use the means F for unseating the check valve $e$, whereupon compressed air is introduced within the chamber 33 in the housing N, through the discharge pipe 41 which now becomes a feed pipe, and thence to the port 46 where such compressed air will pass through the orifice $32^b$ and act upon the rotors to impel the same in the direction the opposite of that in which they move in the pumping action, such compressed air filling the interspaces and excluding the lubricant seal supplied in the pumping action by the several ducts 48 and $51^a$ and $51^d$, and 52 and $52^a$ and $52^b$. This lubricant will however be supplied to the teeth of the rotors to lubricate the same. The compressed air so reversely operating the rotors escapes through the ports 37 and passes through the pipe 36 and port 38 into the housing O where it is discharged through the pipe 39 and connection 40 to the outer air or to the tank or the like from which the lubricant is initially drawn, where screens and baffles may be provided to take out of the discharged air any lubricant content thereof. As soon as such motor starting or reverse operation of the rotors commences, the annulus 91 of the means L is put into operation to turn the toothed annulus 98 through the dogs 104 which are tripped by the shoes 100, such annulus 98 rotating the power shaft G in the normal forward direction to correspondingly rotate the crank shaft H of the motor and initiate motor action, in the usual manner. This motor starting action is terminated by cutting off the supply of the compressed air from the container D through the pipe E into the mechanism, which is done by again seating the check valve $e$ by the means F.

If it is desired to manually start the motor, or crank the same, a crank may be applied to the forward end of the power shaft G, and to pins $g$ thereupon, which forward end is normally covered by detachable screw cap $g^1$.

It is manifest that many departures from the disclosures of the foregoing specification and of the drawings may be made in adapting the invention to varying conditions of use and service, and in accordance with choice of construction and inter-relation of parts and features, all without departing from the spirit of the invention and a fair interpretation thereof.

Having thus disclosed my invention, I claim and desire to secure by Letters Patent:

1. Apparatus of the character disclosed, including a drive shaft, a fluid compressor having a shaft, primary coupling means between the driving shaft and compressor shaft, a clutch controlling the said coupling means, a secondary coupling means connecting the two shafts and arranged to rotate them in a reverse relation and maintain the same direction of rotation of the drive shaft when it is actuated by the compressor, and an automatic clutch in the secondary coupling means constructed to become inoperative when the drive shaft again becomes the source of power.

2. Apparatus of the character disclosed, comprising a drive shaft, a fluid compressor having a shaft, primary coupling means between the drive shaft and compressor shaft, a clutch controlling the said coupling means, manual means for operating the clutch, automatic means for operating the clutch after a predetermined actuation of the compressor, a secondary coupling means connecting the shafts and arranged to rotate them in a reverse relation so as to maintain the same direction of rotation of the drive shaft when the latter is actuated from the fluid compressor, and an automatic clutch in the secondary coupling means which is constructed to become inoperative when the drive shaft again becomes the source of power.

3. Apparatus of the character disclosed, comprising a drive shaft, a fluid compressor having a shaft, primary coupling means between the drive shaft and compressor shaft, a clutch controlling the said primary coupling means, manual means for operating the clutch, spring actuated means for opening the clutch, a detent normally holding the spring actuated means in inoperative position, means for automatically releasing the detent after a predetermined actuation of the compressor, and secondary coupling means connecting the shafts and arranged to rotate the shafts in a reverse relation so as to maintain the same direction of rotation of the drive shaft when the latter is actuated from the compressor, and an automatic clutch in the secondary coupling means constructed to become inoperative when the drive shaft again becomes the source of power.

4. Apparatus of the character disclosed, comprising a drive shaft, a fluid compressor having a shaft, a primary set of gearing between the drive shaft and compressor shaft, a clutch interposed in the gearing, manual means for operating the clutch, a spring actuated plunger for opening the clutch, a detent holding the plunger in inoperative position, means for releasing the detent after a predetermined number of rotations of the compressor shaft, a secondary set of gearing connecting the two shafts and arranged to rotate the same in a reverse relation so as to maintain the same direction of rotation of the drive shaft when the latter is actuated from the compressor shaft, and an automatic clutch in the second set of gearing which becomes inoperative when the drive shaft again becomes the source of power.

5. Apparatus of the character disclosed, comprising a drive shaft, a fluid compressor having a shaft, gearing between the two shafts, a clutch interposed in the gearing, a rotary clutch controlled member, cam means for sliding the clutch control member longitudinally as it is rotated, means actuated by the sliding movement of the clutch control member to open or close the clutch, manual means for rotating the clutch control member in either direction, and spring actuated plunger for rotating the clutch control member to open the clutch, a detent normally holding the plunger in inoperative position, and means for automatically releasing the detent after a predetermined operation of the compressor.

In testimony whereof, I have signed my name to this specification in the presence of two subscribing witnesses.

MORRIS C. WHITE.

Witnesses:
FRANCIS L. ISGRIGG,
ALFRED H. DAEHLER.